Figure 1:
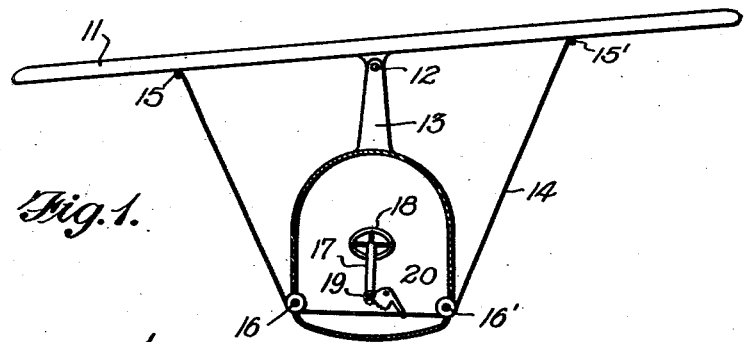

July 12, 1938.  E. B. WILFORD ET AL  2,123,392
AIRCRAFT CONTROL
Filed Oct. 22, 1936

INVENTORS,
EDWARD BURKE WILFORD
BY AND ELLIOT DALAND,
ATTORNEY.

Patented July 12, 1938

2,123,392

UNITED STATES PATENT OFFICE 2,123,392

AIRCRAFT CONTROL

Edward Burke Wilford and Elliot Daland, Philadelphia, Pa.

Application October 22, 1936, Serial No. 107,058

8 Claims. (Cl. 244—83)

This invention refers to the transmission of the motion from the pilot's handwheel to the principal lifting member of a heavier-than-air craft, the control of which is provided by displacing said member bodily and in its entirety relative to the remaining parts of the aircraft. Gusts and other irregular motions of the atmosphere are apt to give rise to short but violent forces on said lifting element which forces when transmitted through the handwheel to the pilot's hands interfere with the ease, comfort, and safety of the control.

The present invention aims at the elimination or at least at a material reduction of such interference. This is accomplished by a large gear ratio between the two ends of the control transmission line in combination with the provision of properly apportioned friction therein. It is contemplated to control the aircraft by turning the handwheel through large angles, the entire range of motion of the handwheel being of the order of magnitude of two complete turns. The transmission members are further designed for a mechanical efficiency quite different in the two directions. When transmitting a motion from the pilot to the lifting member, the efficiency is comparatively large, but when transmitting a motion from the lifting member to the pilot's handwheel, the efficiency is small, but still positive, which means to say that the transmission line is not self locking but reversible. In that manner, the "feel" and the automatic stability features of the control are preserved, while the control is made well manageable in gusty weather.

It is accordingly the broad object of the present invention to provide for a reversible control transmission line between a handwheel and the displaceable major lifting member of a heavier-than-air craft, which keeps away from the pilot excessive jerks from the air shocks received by the lifting member.

It is further an object of this invention to provide for such transmission line having a comparatively large efficiency for transmitting motion from the pilot to the lifting member and a comparatively small efficiency for transmitting motion in the opposite direction.

It is further an object of this invention to provide for such transmission line with a handwheel turning through a range larger than one and one-half complete turns and requiring a correspondingly small maximum control force.

It is a further object of this invention to provide such transmission line comprising a reversible worm gear.

These and other desirable objects and advantages of the present invention will be illustrated in the accompanying drawing and described in the specification, a certain preferred embodiment being disclosed by way of illustration only, for, since the underlying principles may be incorporated in other specific devices, it is not intended to be limited to the one here shown except as such limitations are clearly imposed by the appended claims.

Figure 2:
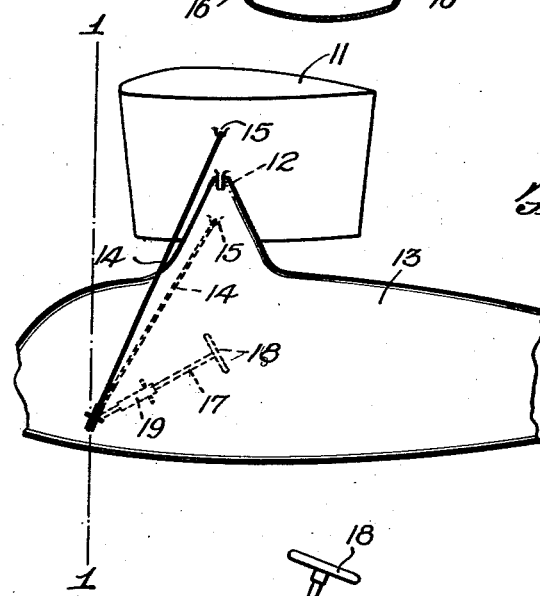
Figure 3:
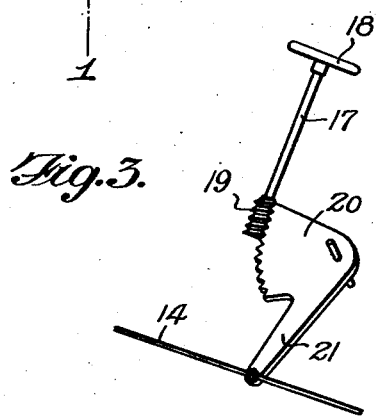

In the drawing, like numerals refer to similar parts throughout the several views, of which Fig. 1 represents a front elevation and partial section of an airplane incorporating the invention, Fig. 2 represents a side elevation and partial section of the same, and Fig. 3 represents the handwheel and the worm gear of Fig. 1 in a larger scale, in perspective view.

In Fig. 1, there is represented a monoplane having as major lifting member a wing 11, hinged at 12 to the fuselage structure 13. The lateral orientation of wing 11 relative to fuselage 13 is determined by a cable 14 fastened to the wing at the points 15 and 15' and guided by pulleys 16 and 16' mounted on the fuselage 13. There is rotatably mounted in fuselage 13 a control axle 17 having a handwheel 18 and a worm 19 in mesh with the worm gear segment 20 likewise rotatably mounted on the fuselage structure 13. An arm 21 extends from the segment 20, to the end of which the cable 14 is fastened.

Worm gear 19 and 20 is reversible and not self locking. That is to say, segment 20 can be turned by turning the worm 19, and said worm can be turned by turning the segment 20. This is accomplished in a known manner by making the pitch of the worm 19 large enough. How large depends on the friction between worm and worm gear. It is preferred to provide for a small friction by the use of known antifriction devices not shown in the drawing, whereby even a small-pitch worm will become reversible, and a large gear ratio of the worm gear obtained. The length of arm 21 is so proportioned that it requires about two complete turns of wheel 19 to tilt wing 11 from one extreme position to the other.

The airplane is steered laterally by turning wheel 18. This tilts wing 11 relative to fuselage 13, whereby the line of the aerodynamic force is displaced to the left or right of the center of gravity of the aircraft, and hence a control moment created.

We claim:

1. In a heavier-than-air craft for steering the same, the combination with a displaceable principal lifting member, of a hand wheel, and of reversible transmission means operatively connecting the hand wheel and the lifting member, the mechanical efficiency of said transmission means being substantially larger for transmitting motion from the hand wheel to the lifting member than for transmitting motion in the opposite direction.

2. In a heavier-than-air craft for steering the same, the combination with a tiltable principal lifting member, of a hand wheel, and of reversible transmission means operatively connecting the hand wheel and the lifting member, the mechanical efficiency of said transmission means being substantially larger for transmitting motion from the hand wheel to the lifting member than for transmitting motion in the opposite direction.

3. In a heavier-than-air craft for steering the same, the combination with a displaceable principal lifting member, of a hand wheel, and of reversible transmission means operatively connecting the hand wheel and the lifting member, the mechanical efficiency of said transmission means being substantially larger for transmitting motion from the hand wheel to the lifting member than for transmitting motion in the opposite direction, and the range of motion of the hand wheel exceeding one and one-half complete turns.

4. In a heavier-than-air craft for steering the same, the combination with a tiltable principal lifting member, of a hand wheel, and of reversible transmission means operatively connecting the hand wheel and the lifting member, the mechanical efficiency of said transmission means being substantially larger for transmitting motion from the hand wheel to the lifting member than for transmitting motion in the opposite direction, and the range of motion of the hand wheel exceeding one and one-half complete turns.

5. In a heavier-than-air craft for steering the same, the combination with a displaceable principal lifting member, of a hand wheel, and of a reversible worm gear consisting of a worm driven from the hand wheel and a worm gear wheel operatively connected to the lifting member.

6. In a heavier-than-air craft for steering the same, the combination with a tiltable principal lifting member, of a hand wheel, and of a reversible worm gear consisting of a worm driven from the hand wheel and a worm gear wheel operatively connected to the lifting member.

7. In a heavier-than-air craft for steering the same, the combination with a displaceable principal lifting member, of a hand wheel, and of a reversible worm gear consisting of a worm driven from the hand wheel and a worm gear wheel operatively connected to the lifting member, the hand wheel having a range of motion exceeding one and one-half complete turns.

8. In a heavier-than-air craft for steering the same, the combination with a tiltable principal lifting member, of a hand wheel, and of a reversible worm gear consisting of a worm driven from the hand wheel and a worm gear wheel operatively connected to the lifting member, the hand wheel having a range of motion exceeding one and one-half complete turns.

E. BURKE WILFORD.
ELLIOT DALAND.